United States Patent [19]

Wolfe

[11] 4,358,018
[45] Nov. 9, 1982

[54] ARTICLE STORAGE APPARATUS

[76] Inventor: Ingo E. Wolfe, 2901-80th Ave. North, Brooklyn Park, Minn. 55444

[21] Appl. No.: 182,959

[22] Filed: Sep. 2, 1980

[51] Int. Cl.³ .............................................. A47F 7/00
[52] U.S. Cl. .................................... 211/41; 206/387; 211/163
[58] Field of Search .................. 211/40, 163, 41, 133, 211/131, 94, 94.5, 162; 206/387; 312/8, 9, 10, 11, 12

[56] References Cited

U.S. PATENT DOCUMENTS

| D. 256,643 | 9/1980 | Johnson | 211/40 X |
|---|---|---|---|
| 954,793 | 4/1910 | Graham | 211/163 X |
| 3,452,878 | 7/1969 | Smith | 211/41 |
| 3,610,424 | 10/1971 | Connan | 211/40 |
| 3,702,132 | 11/1972 | Fites et al. | 206/387 |
| 3,746,180 | 7/1973 | Spiroch et al. | 211/41 X |
| 3,909,088 | 9/1975 | Dennehey et al. | 211/41 X |
| 3,938,665 | 2/1976 | Rumble | 211/4 |
| 4,102,458 | 7/1978 | Fors | 211/4 |
| 4,117,931 | 10/1978 | Berkman | 206/384 |

FOREIGN PATENT DOCUMENTS 1520957  3/1968  France .................................. 211/40

OTHER PUBLICATIONS

*Montgomery Ward* Advertising Publication, Nov. 1, 1980.

*Primary Examiner*—Roy D. Frazier
*Assistant Examiner*—Robert W. Gibson, Jr.

*Attorney, Agent, or Firm*—Burd, Bartz & Gutenkauf

[57] ABSTRACT

A holding and storage apparatus for tape cassettes adapted to be attached to a door of a glove compartment of an automobile in a location so that a plurality of tape cassettes can be stored within the glove compartment. The apparatus is a metal extrusion having a generally flat base integral with a plurality of spaced parallel ribs providing grooves for accommodating the enlarged sections of tape cassettes. Lips on the outer edges of the ribs engage the top edges of the enlarged sections of the tape cassettes to hold the cassettes in the grooves between adjacent ribs. The ribs have stops that locate and limit longitudinal movement of the tape cassettes in the grooves. A modified tape cassette storage apparatus has a generally upright base integral with a platform attached to downwardly curved legs. A plurality of oppositely directed ribs are integral with the base to provide grooves for accommodating the enlarged sections of the tape cassettes. Each of the ribs has lips on the outer edges thereof which cooperate with the top edges of the enlarged sections of the tape cassettes to hold the tape cassettes in the grooves. Stop projections on the ribs locate and limit longitudinal movement of the tape cassettes in the grooves. A second modification of the tape cassette storage apparatus has a circular base integral with outwardly directed circumferentially spaced ribs providing a plurality of grooves accommodating the enlarged sections of the tape cassettes. Each of the ribs has lips on the outer edges thereof that engage the top edges of the enlarged sections of the tape cassettes to hold the tape cassettes in the grooves.

8 Claims, 16 Drawing Figures

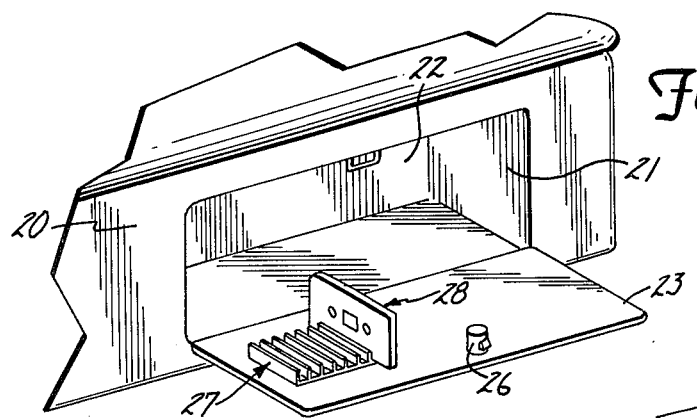
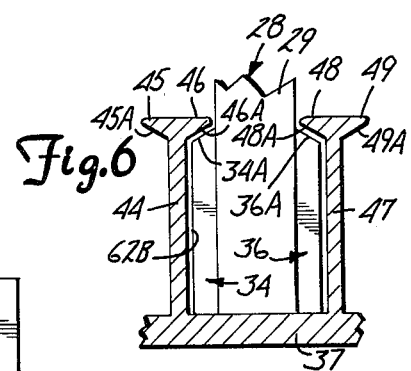
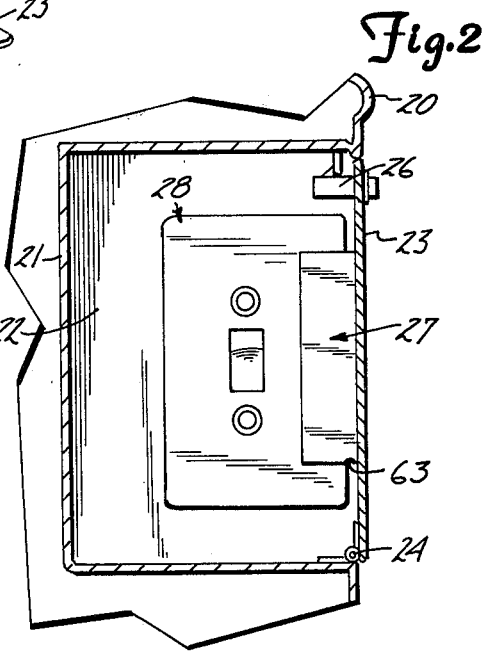
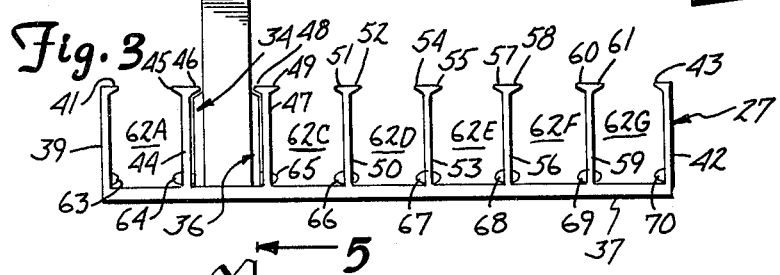
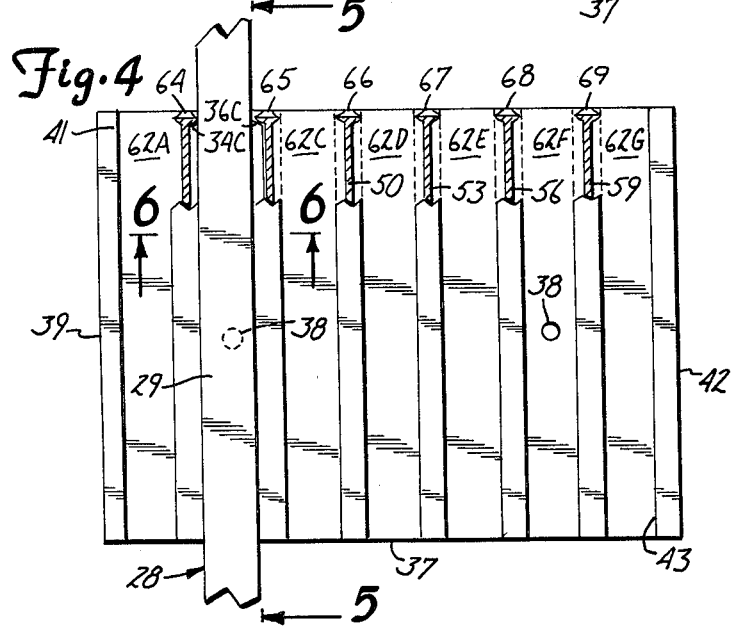
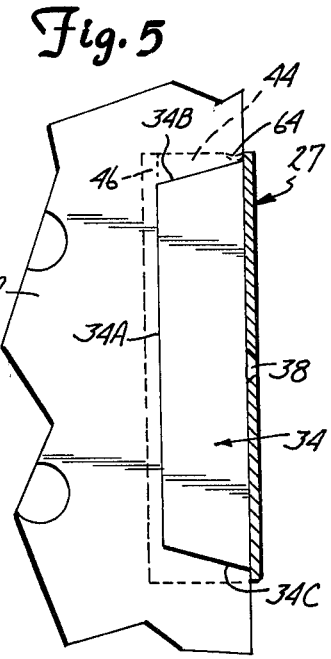

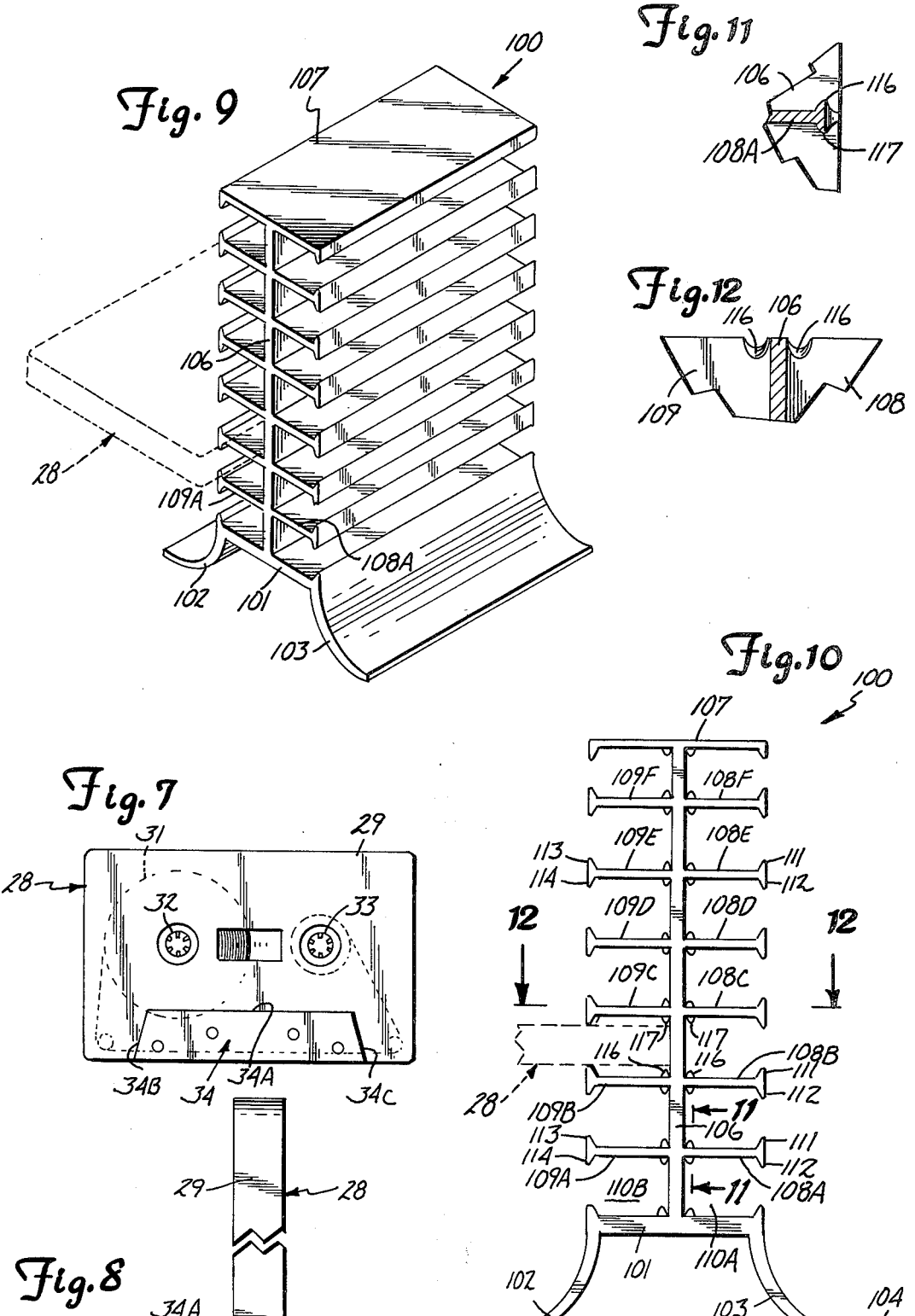

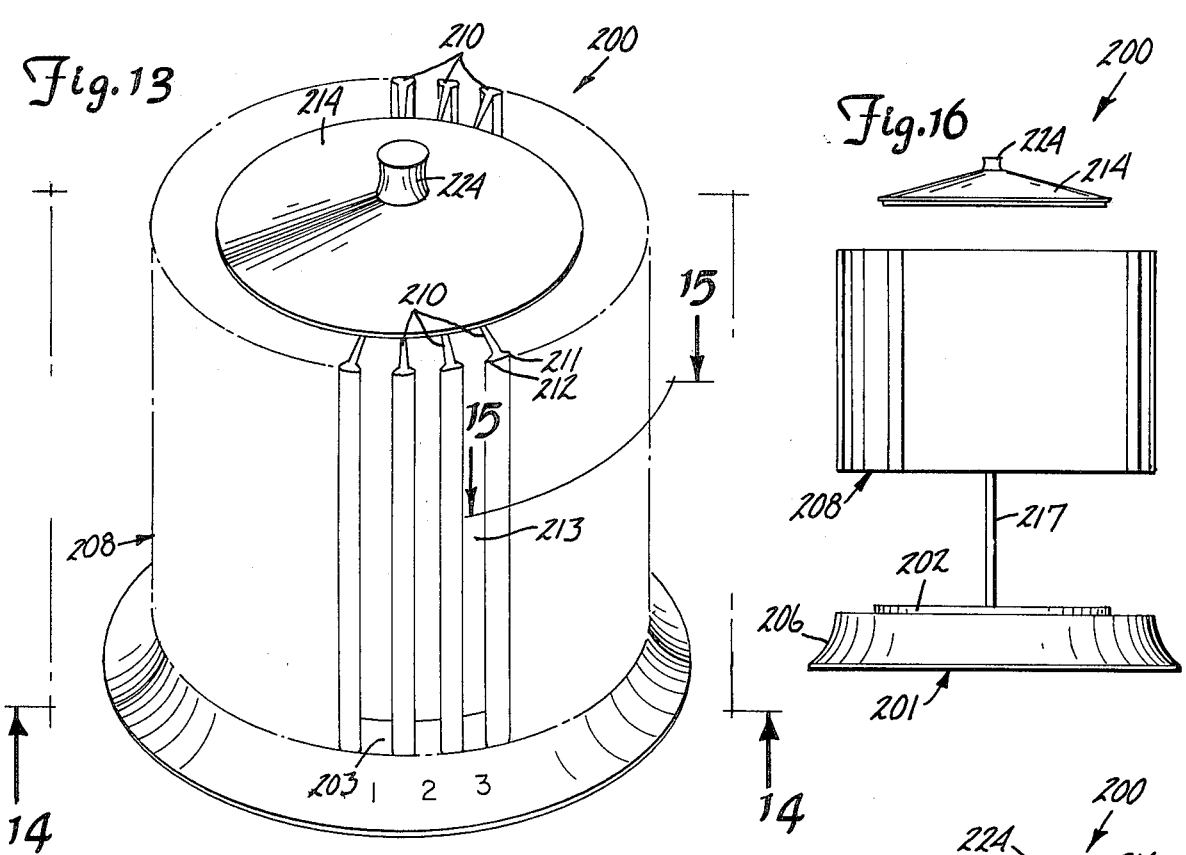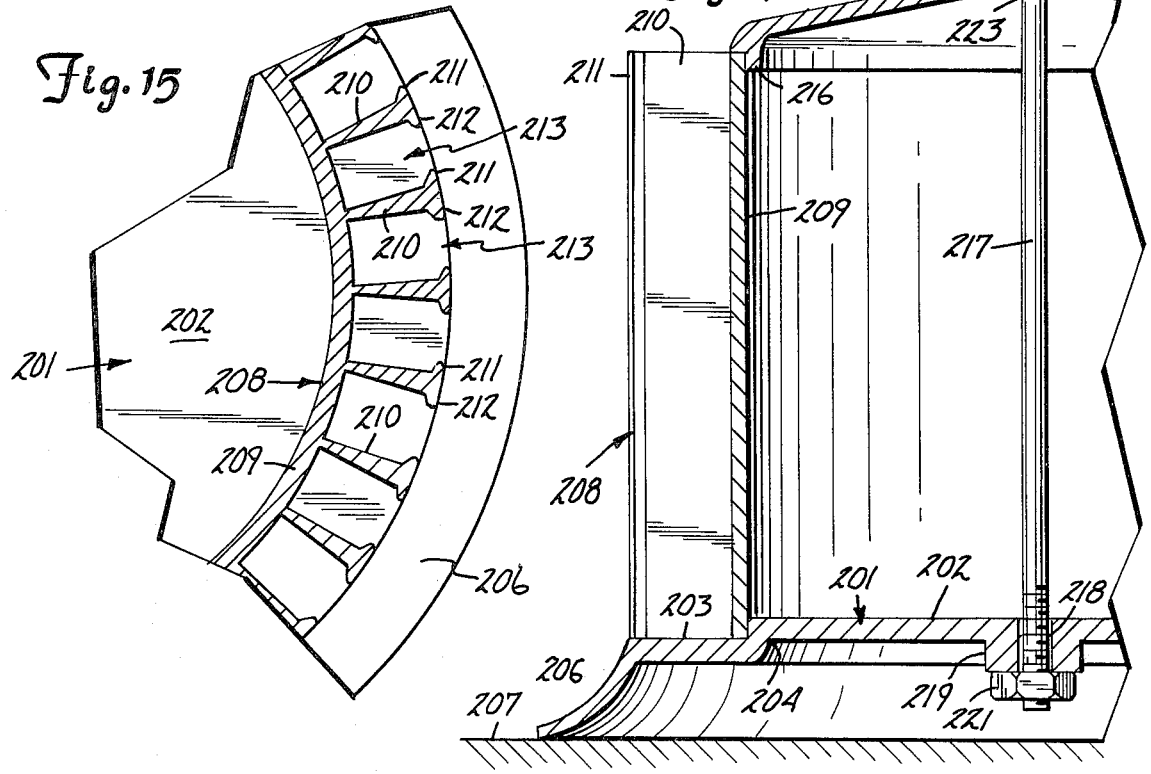

4,358,018

ARTICLE STORAGE APPARATUS

SUMMARY OF INVENTION

The invention relates to an article storing apparatus, and, more particularly, to an improved apparatus for storing conventional tape cassettes. Tape cassettes are in wide use in the home and motor vehicles, such as automobiles, trucks, motor homes, and the like. The conventional tape cassettes have a generally flat rectangular box housing having an opening along one side for accommodating a continuous segment of tape. The opening is bordered by enlarged side sections or enlargements having a generally trapezoidal configuration. Tape cassettes are usually stored in cases or boxes. An example of a case for storing magnetic tape cassettes is shown by Berkman in U.S. Pat. No. 4,117,931. These boxes are relatively large and cannot be stored in a small space, as the glove compartment of a motor vehicle. Tape cassettes are usually stored loose in the glove compartments of motor vehicles. They become mixed with the other articles in the glove compartment so that they are not readily accessible for use. The tape cassettes, when stored at random in glove compartments, can be damaged.

The tape storage means of the invention is used with a motor vehicle glove compartment having a wall means surrounding a storage area. The wall means has a conventional front opening providing access to the storage area. A door means movably mounted on the wall means closes the opening. The article storage means for accommodating one or more tape cassettes is mounted on the inside of the door means and movable into the storage area of the glove compartment when the door means is closed. The article storage means has means for holding the tape cassettes. The means for holding the tape cassettes includes a plurality of generally parallel laterally spaced ribs providing grooves for accommodating the enlarged sections of the tape cassettes. Each of the ribs has a linear outer edge joined to laterally directed linear ribs. The ribs cooperate with the enlarged sections of the tape cassettes to prevent the cassettes from transversely separating from the article storage means. The grooves each have an open end allowing the tape cassette to move longitudinally into a groove locating the enlarged sections of the tape cassettes under the lips. The ribs have stop means on the ends remote from the open end that engage the large sections of the tape cassettes to limit movement of the tape cassettes in one direction of the grooves.

A modification of the tape cassette storage means has an upright wall supporting a plurality of oppositely directed ribs. The adjacent ribs on each side of the wall are laterally spaced from each other and form grooves to accommodate the enlarged sections of the tape cassettes. Each of the ribs has an outer edge joined to laterally directed lips that cooperate with the enlarged sections of the tape cassettes to retain the tape cassettes in assembled relation with the ribs. Stop means on one end of the ribs limit the longitudinal movement of the tape cassettes in one direction in the grooves. The tape cassettes are longitudinally inserted into the grooves through the open ends thereof and are retained therein transversely by the ribs and longitudinally in one direction by the stops.

In a second form or modification of the tape cassette storage means, the ribs are joined to a cylindrical base. The ribs project in a radial outward direction and are circumferentially spaced from each other to form grooves for accommodating the enlarged sections of tape cassettes. Each of the ribs has an outer edge joined to the laterally directed lips which cooperate with the enlarged sections of the tape cassettes to retain the tape cassettes in assembled relation with the ribs. The cylindrical base is mounted on a support. A cover closing one end of the cylindrical member is retained thereon with a releasable means attached to the support.

An object of the invention is to provide a tape cassette holder useable in association with a glove compartment of a motor vehicle for storing a plurality of tape cassettes. A further object of the invention is to provide a tape cassette holder with rib and lip structure that cooperates with the enlarged sections of a conventional tape cassette to retain the tape cassette in assembled relation with the holder and, yet, permit the tape to be readily removed from the holder. A further object of the invention is to provide a modular tape cassette holder that can be located in rows and used above or on the under side of a support or shelving. Another object of the invention is to provide a tape cassette holder which has rib and lip structures providing grooves for accommodating the tape cassette in a manner wherein the cassettes can be inserted and removed from the holder with a minimum of manipulation. Yet another object of the invention is to provide a one-piece tape cassette holder that can be made with a material extruding process and is sturdy and durable in use. These and other objects and advantages of the tape cassette storage apparatus are embodied in the preferred embodiments hereinafter described.

IN THE DRAWINGS

FIG. 1 is a fragmentary perspective view of the dash panel of a motor vehicle having a glove compartment door in the open position with the tape cassette storage apparatus of the invention mounted on the glove compartment door;

FIG. 2 is a side elevational view of the dash board panel with the glove compartment door closed showing the storage position of the tape cassette storage apparatus;

FIG. 3 is a front elevational view of the cassette storage apparatus of the invention;

FIG. 4 is a top plan view, patly sectioned, of the cassette storage apparatus;

FIG. 5 is an enlarged sectional view taken along the line 5—5 of FIG. 4;

FIG. 6 is an enlarged sectional view taken along the line 6—6 of FIG. 4;

FIG. 7 is a top view of a tape cassette;

FIG. 8 is a foreshortened end view of the tape cassette of FIG. 7;

FIG. 9 is a perspective view of a first modification of the tape cassette storage apparatus of the invention;

FIG. 10 is an end elevational view of FIG. 9;

FIG. 11 is an enlarged sectional view taken along the line 11—11 of FIG. 10;

FIG. 12 is an enlarged sectional view taken along the line 12—12 of FIG. 10;

FIG. 13 is a perspective view of a second modification of the tape cassette storage apparatus of the invention;

FIG. 14 is a sectional view taken along the line 14—14 of FIG. 13;

FIG. 15 is an enlarged sectional view taken along the line 15—15 of FIG. 13; and FIG. 16 is an exploded side elevational view of the tape cassette storage apparatus of FIG. 13.

DESCRIPTION OF PREFERRED EMBODIMENTS

Referring to FIGS. 1 and 2, there is shown a portion of a dash panel 20 of a motor vehicle, such as an automobile, truck, tractor, motor home, or the like. Panel 20 has a conventional glove compartment or box 21 providing a storage area or chamber 22 for accommodating objects, such as maps, gloves, and the like. Chamber 22 is normally closed with a door 23 pivotally connected with one or more hinges 24 to a lower portion of panel 20. The upper part of door 23 has a releasable lock 26 that is operable to hold the door in a closed position, as shown in FIG. 2. An article storage unit or apparatus indicated generally at 27 mounted on the inside of door 23 accommodates one or more articles, such as tape cassettes. Fastening means (not shown), such as screws, bolts, adhesives, are used to attach article storage apparatus 27 to the inside of door 23. Article storage apparatus 27 can be attached to other portions to the side wall, bottom wall, or top wall of box 21 or other portions of the vehicle. Article storage apparatus 27 can be attached to other supports, including, but not limited to, tables, desks, tape deck supports, and like furniture.

Referring to FIGS. 7 and 8, there is shown an article 28 which can be held by storage apparatus 27. Article 28 is a conventional tape cassette having a rectangular body or housing 29 accommodating a roll of magnetic tape 31. Housing 29 rotatably supports a pair of spaced spools 32 and 33 accommodating magnetic tape 31. Housing 29 has large side bosses or sections 34 and 36, known as enlargements, extended along the lower edge of the housing. Side section 34 has a linear longitudinal top edge 34A and downwardly and outwardly tapering end edges 34B and 34C. Side section 36 has a longitudinal linear top edge 36A and downwardly and outwardly diverging end edges 36B and 36C. Side sections 34 and 36 are identical in shape and are located on opposite sides of housing 29.

Referring to FIGS. 3 and 4, article storage apparatus 27 has a flat generally rectangular base 37 provided with a pair of holes 38 for accommodating bolts used to attach a base to a support, such as door 23. Base 37 has a flat bottom that can accommodate an adhesive or tape to secure the base to a support. Upwardly directed longitudinal side walls 39 and 42 are joined to opposite sides of base 37. Side wall 39 has an inwardly directed continuous lip or bead 41. Side wall 42 has an inwardly directed continuous lip or bead 43. The space between the side walls 39 and 42 is divided with a plurality of walls or ribs 44, 47, 50, 53, 56, and 59. The entire article storage apparatus 27 is a one-piece metal structure. Preferably, apparatus 27 is an extruded aluminum member. Other materials, as plastics, can be used to make article storage apparatus 27. Each rib is a generally flat member that extends across the width of the base 37 generally parallel to side walls 39 and 42. The adjacent ribs 44, 47; 47, 50; 50, 53; 53, 56; 56, 59 are laterally spaced from each other to form slots or grooves 62A-62G for accommodating the bottom or base side of housing 29. Each rib 44, 47, 50, 53, 56, and 59 has oppositely projected continuous and linear beads or lips which cooperate with the upper edges 34A and 36A of the side sections 34 and 36 to hold housing 29 in sliding assembled relation with storage apparatus 27. Rib 44 has lips 45 and 46. Rib 47 has lips 48 and 49. Rib 50 has lips 51 and 52. Rib 53 has lips 54 and 55. Rib 56 has lips 57 and 58. Rib 59 has lips 60 and 61. Each pair of lips project in opposite lateral directions from the outer edge of the rib joined to the lips. All of the lips 41, 45, 46, 48, 49, 51, 52, 54, 55, 57, 58, 60, 61 are continuous beads that extend the full length of the ribs and side walls, respectively, and are located in generally the same plane which is parallel to base 37. As shown in FIGS. 3 and 4, the portions of the side walls 39 and 42 and each rib 44, 47, 53, 56, and 59 are provided with projections or stops 63-70, respectively. The stops are located adjacent base 37. The stops 63-70 are formed by pressing a tool into the metal to deform the metal into oppositely directed lateral projections.

Referring to FIG. 6, groove 62B has a width slightly larger than the width of the bottom section of cassette 28. Lip 46 has an upwardly and inwardly inclined wall 46A that is angled at substantially the same angle as the top edge 34A of the side section 34. Preferably, the angle is 120 degrees from the upright plane of rib 44. Lip 48 has an upwardly and inwardly inclined wall 48A having an angle that is substantially the same as the angle of top edge 36A. This angle is the same as the angle of top edge 34A. The angle extends upwardly and outwardly at an angle of 120 degrees with respect to vertical plane of rib 47. Each of the lips on the side walls 39 and 42 and ribs 44, 47, 50, 53, 56, and 59 have similar inside surfaces that are inclined to conform to the inclination of the top edges 34A and 36A of the side sections 34 and 36, respectively.

As shown in FIGS. 3 and 4, when tape cassette 28 is moved longitudinally in groove 62B, the large portion thereof formed by the side sections 34 and 36 loosely fits between ribs 44 and 47. Longitudinal edges 34A and 36A face the inclined surfaces 46A and 48A, respectively. When tape cassette 28 is moved or inserted from the open end of groove 62B to its full in or loaded position, the end edges 34C and 36C engage stops 64 and 65, as shown in FIG. 4, thereby limiting inward longitudinal movement of the tape cassette. When door 23 is moved to the closed position, as shown in FIG. 2, stops 64 and 65 prevent cassette 28 from sliding down to the bottom of the gloove compartment.

Referring to FIGS. 9 and 10, there is shown a modification of the tape cassette storage apparatus indicated generally at 100 for accommodating a plurality of conventional tape cassettes, as tape cassette 28. Storage apparatus 100 has a flat rectangular support or plate 101 joined to outwardly and downwardly curved legs 102 and 103. The lower edges of the legs 102 and 103 are supported on a fixed member or support surface 104, such as a table, desk, or the like. An upright flat center wall or base 106 is joined to the mid-section of support 101. A top wall 107 is joined to the top of center wall 106. A plurality of generally flat ribs or flanges 108A-108F and 109A-109F have inner ends integral with center wall 106 and are vertically spaced from each other between support 101 and top wall 107. Adjacent ribs 108A and 109A are located in the same horizontal plane and spaced above support 101 to form longitudinal grooves or pockets 110A and 110B for accommodating the enlarged sections of tape cassettes. Each flange 108A-108F has a pair of upwardly and downwardly directed linear and continuous lips 111 and 112 along the outer edge thereof. Flange 109A has similar upwardly and downwardly directed lips 113 and 114 along the outer edge thereof. The lips 111-114 have inside tapered surfaces that cooperate with the top edges of the enlarged section of the tape cassettes to prevent the tape cassettes from moving laterally out of grooves 110A and 110B. As shown in FIG. 11, center wall 106 is provided at its outer or rear end with a pair of oppositely directed stops 116 and 117 which prevent the tape cassette 28 from moving through the groove 110A. The stops 116 and 117 engage cassette edges 34C and 36C which limit the longitudinal movement of the cassette in the groove. As shown in FIGS. 11 and 12, stops 116 and 117 are formed by deforming or punching metal sections of ribs 108C and 109C adjacent wall 106.

Referring to FIGS. 12 and 13, there is shown a second modification of the tape cassette storage apparatus indicated generally at 200 of the invention. The storage apparatus 200 is a carousel assembly adapted to accommodate a number of tape cassettes, such as tape cassette 28. Storage apparatus 200 has a circular support 201 adapted to be located on a fixed member 207, such as a table, desk, or the like. Support 201 has a circular top wall 202 joined at its outer edge to a generally horizontal circular annular shoulder 203. A circular generally upright edge 204 is located between top wall 202 and shoulder 203. Shoulder 203 is joined with an outwardly and downwardly curved rim 206 adapted to engage the support 207.

An upright cylindrical holding unit indicated generally at 208 is mounted on shoulder 203. Holding unit 208 has a cylindrical member or base 209 integral with a plurality of circumferentially spaced radial ribs or flanges 210. The ribs 210 extend the length or height of cylindrical member 209 and are circumferentially spaced from each other to provide generally upright grooves or slots 213. As shown in FIG. 15, the adjacent sides of ribs 210 are generally parallel to each other and provide a generally rectangular slot shape. Each rib has at its outer edge oppositely directed lips 211 and 212 similar in shape to the lips 45 and 46, as shown in FIG. 6. The slots 213 are of a size to accommodate the enlarged sections of cassette body 29. The linear top edges 34A and 36A of the cassette engage adjacent lips 211 and 212 to prevent the cassette from moving radially out of slot 213. The tape cassette 28 is moved downwardly into slot 213 and retained therein by the cooperating lips 211 and 212 and shoulder 203.

A cover or top wall 214 is mounted on cylindrical member 209. Cover 214 has a downwardly directed circular annular flange or lip 216 that fits into inside wall 209, as shown in FIG. 14. Cover 14 is held in assembled relation with cylindrical member 209 with a rod 217. Rod 217 has a lower threaded end threaded into a hole 218 in the center of top wall 202. Rod 217 is locked into engagement with a boss 219 on wall 202 with a nut 221. The upper end of rod 217 projects through a hole 223 in the center of cover 214. An ornamental nut 224 threaded on the upper end of rod 217 engages the cover 214 to hold cover 214 on member 209. Nut 224 in conjunction with the rod 217 also holds the holding unit 208 in firm engagement with base 201. Other means can be used to hold cover 214 in its assembled relation with the holding unit 208.

Holding unit 208 can be extruded metal, as aluminum. Support 201 and cover 214 can be molded plastic or wood. Other materials may be used to make holding unit 208, support 201, and cover 214.

While there has been shown and described the preferred embodiments of the tape cassette storage apparatus of the invention, it is understood that changes in the structure, materials, shape, and use may be made by those skilled in the art without departing from the invention. The invention is defined in the following claims.

The embodiments of the invention in which an exclusive property or privilege is claimed are defined as follows:

1. An apparatus for storing one or more articles, as tape cassettes, having a housing with opposite sides and enlarged sections on said sides, said enlarged sections having top edges and end edges, comprising: a base including a center wall, a plurality of elongated ribs secured to said center wall and projected outwardly from opposite sides of said center wall, the adjacent ribs on each side of the center all extending parallel to each other and being laterally spaced providing grooves to accommodate tape cassette housings and enlarged sections thereof, lip means on said ribs engageable with said top edges of the enlarged section of the tape cassette to retain the tape cassettes in said grooves, stop means on end portions of the ribs engageable with one edge of said enlarged sections to limit longitudinal movement of the tape cassettes in one direction in said grooves, a support attached to said center wall, and leg means attached to said support to locate the apparatus on a fixed support.

2. The apparatus of claim 1 wherein: said ribs have outer edges, said lip means are linear continuous members on the outer edges of the ribs projected in opposite lateral directions from the ribs.

3. The apparatus of claim 2 wherein: each lip means has an inclined inner surface extended upwardly and outwardly from the rib joined to the lip means, said top edge of the enlarged sections of the tape cassette being engageable with said surface.

4. The apparatus of claim 1 wherein: said stop means comprises projections on said ribs extended in opposite directions, said projections being engageable with one of said end edges of said enlarged sections to limit longitudinal movement of the tape cassettes in one direction in said grooves.

5. An apparatus for storing one or more articles, as tape cassettes, having a housing with opposite sides and enlarged sections on said sides, said enlarged sections having top edges and end edges, comprising: a base including a cylindrical member, a plurality of elongated ribs attached to and projected outwardly from said cylindrical member, adjacent ribs extended parallel to each other and being laterally spaced from each other providing grooves to accommodate tape cassette housings and enlarged sections thereof, adjacent ribs being circumferentially spaced from each other providing said grooves, lip means on said ribs engageable with said top edges of the enlarged sections of the tape cassettes to retain the tape cassettes in said grooves, a support engageable with said cylindrical member to locate the cylindrical member relative to a fixed member, a cover engageable with the cylindrical member, and means holding the support and cover in engagement with the cylindrical member.

6. The apparatus of claim 5 wherein: said ribs have outer edges, said lip means are linear continuous members on the outer edges of the ribs projected in opposite lateral directions from the ribs.

7. The apparatus of claim 6 wherein: each lip means has an inclined inner surface extended upwardly and outwardly from the rib joined to the lip means, said top edge of the enlarged sections of the tape cassette being engageable with said surface.

8. The apparatus of claim 5 wherein: said support has an annular shoulder located adjacent an end of the grooves, and said cover being located inwardly of said grooves whereby tape cassettes can be longitudinally inserted into the grooves from the open ends thereof.

* * * * *